United States Patent

Chartier

[15] 3,635,434
[45] Jan. 18, 1972

[54] WHEEL SUPPORT

[72] Inventor: Guy Chartier, West Hill, Ontario, Canada

[73] Assignee: Guy Chart Tools Limited, Ontario, Canada

[22] Filed: Feb. 9, 1970

[21] Appl. No.: 9,594

[52] U.S. Cl. ........................................248/352, 280/150 A
[51] Int. Cl. .........................................................B60r 27/00
[58] Field of Search...............248/352; 280/35, 47.15, 150 A

[56] References Cited

UNITED STATES PATENTS 1,853,318  4/1932  Peters......................................280/35
2,493,295  1/1950  Kron......................................248/352
3,317,218  5/1967  Rivolta..............................248/352 X Primary Examiner—William H. Schultz
Attorney—Westell & Hanley

[57] ABSTRACT

A support takes the place on an automobile of a wheel removed, having a caster support designed to rest on the ground, an arm rigidly connected to the support attached to one wheel bolt and an arm pivotally connected to the support attached to the other wheel bolt.

1 Claims, 2 Drawing Figures

PATENTED JAN 18 1972　　3,635,434

*INVENTOR.*
GUY CHARTIER
BY
*Westell & Hanley*

WHEEL SUPPORT

This invention relates to a stand which is used to support one corner of an automobile, in substitution for a wheel which has been removed at that corner.

It is an object of the invention to provide a stand which provides a firm support for the automobile at the corner, where a wheel has been removed and in substitution for the wheel.

It is an object of the invention to provide a stand which is, without lack of structural stability, adjustable to support any type of automobile by attachment to the wheel bolts thereof at the corner of the automobile where a wheel has been removed.

It is an object of the invention to provide a stand which supports the auto on a base surface in place of the wheel removed, but which is much less likely, than with prior art stands, to tip under the forces created by small forward and rearward movements of the automobile being repaired.

Figure 1:
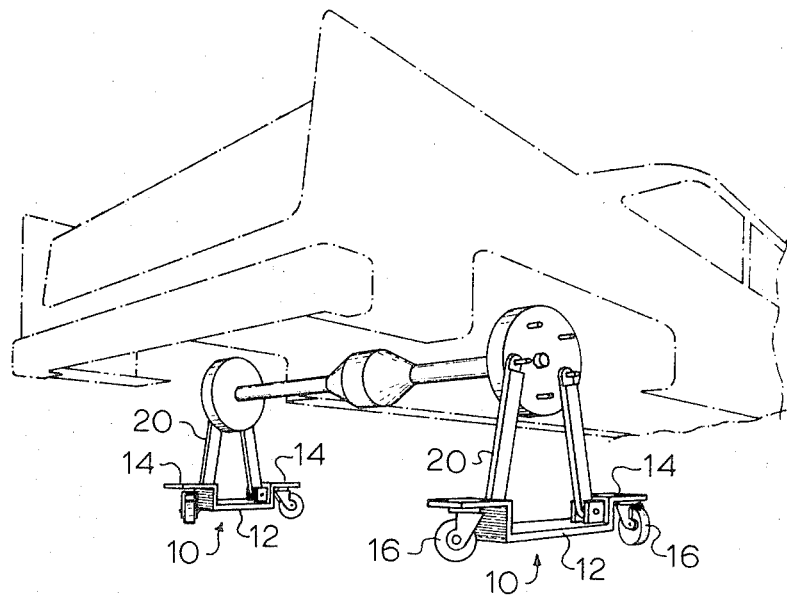
Figure 2:
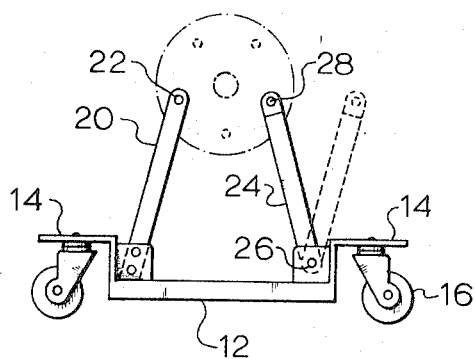

In drawings which illustrate a preferred embodiment of the invention:

FIG. 1 shows a perspective of an automobile with the invention replacing the auto wheel at each rear corner; and FIG. 2 shows a side view of a device in accord with the invention.

The stand comprises a baseplate 10 having a central lower platform 12 and being stepped up at each end to provide platforms 14. Casters 16 are mounted on the lower side of each platform, to support the platform clear of the ground. As hereinafter explained, the stability of the device will be greatly increased where, as shown, the under surface of the upwardly stepped platform 14 is higher than the upper surface of the central lower platform 12.

The casters 16 are shown mounted on the underside of the steps rotatable about a vertical axis in addition to being pivotal about their own axes. It will be noted, and it is important to the stability of the device, that the connection of the caster to the underside of stepped platform 14 is higher than the upper surface of central platform 12.

Adjacent one end of the central platform, there is provided a upwardly extending arm 20 rigidly connected to the lowered central platform 12 at the level of its upper surface. The arm 20 slopes upwardly and inwardly from its mounting to an aperture at 22 dimensioned to receive the wheel bolt of an automobile wheel hub.

Adjacent the other end of the central platform, there is provided an upwardly extending arm 24 pivotally joined to the central platform at 26 but otherwise preferably of similar construction to arm 20. Pivoted arm 24 is, adjacent its upper extremity, provided with an aperture at 28 for receiving the wheel bolt of a wheel hub.

The device is usually applied to the wheel immediately the wheel is removed. Accordingly with the car jacked up for removal of the wheel, and with the wheel removed, the rigid and pivoted arms 20 and 24 are bolted in place on convenient wheel bolts on whatever make of car is being supported. The length and geometry of the arms is such that the arms 20 and 24 do not cross but retain their respective sides forming, when bolted in place, an irregular tetragon. It will be noted that the tetragon is rigid. The line from the pivotal connection at 26 of the arm 24 to the platform, to the connection at 22 of the rigid arm 20 to the hub, may be considered one side of a triangle, the other two sides being formed by the wheel hub between the pivot connections at 20 and 28 and by the pivotally connected arm 24. Thus although the device is adjustable to fit different wheel hub designs, in each case an absolutely rigid support member is formed. With the support member bolted in place on the jacked corner of the automobile, the jack may be lowered with the support member oriented to firmly support the automobile. Such support is effective and strong for any automobile.

FIG. 1 shows two such supports in place supporting both rear corners of the automobile.

Stability of the device shown is greatly increased by an arrangement shown best in FIG. 2. The connection from the central platform 12 to the rigid and fixed arms 20 and 24 is lower than the connection from the steps 14 to the casters.

I claim:

1. Support for an automobile with the wheel removed comprising:
    a baseplate provided with two casters designed to be located and oriented with the two casters on the ground supporting the baseplate thereabove,
    an arm designed to extend upwardly from the baseplate in such orientation and rigidly connected thereto, having an aperture adjacent its upper end for attachment to a wheel bolt of an automobile hub;
    where said arm is oriented relative to said baseplate to attach to a wheel bolt on an automobile wheel hub at a bolting location disposed vertically over a location between the caster connections to said baseplate;
    an arm pivotally joined to said baseplate at a location spaced from said rigid arm, said arm being designed to extend upwardly from said baseplate;
    said pivotally joined arm being apertured adjacent its upper end, to attach to a wheel bolt on an automobile wheel hub, at a bolting location disposed vertically over a location between the caster connections to said baseplate;
    wherein said arms are respectively connected to said baseplate adjacent opposite ends of the latter, but in each case inward of the respective adjacent caster mount.

* * * * *